May 10, 1955  M. J. STURTEVANT  2,708,111
SPRING LEAF INTERLINER

Filed Oct. 9, 1953  2 Sheets-Sheet 1

INVENTOR.
Mark J. Sturtevant.
BY
Harness and Harris
ATTORNEYS

May 10, 1955　　　M. J. STURTEVANT　　　2,708,111
SPRING LEAF INTERLINER
Filed Oct. 9, 1953　　　　　　　　　2 Sheets-Sheet 2
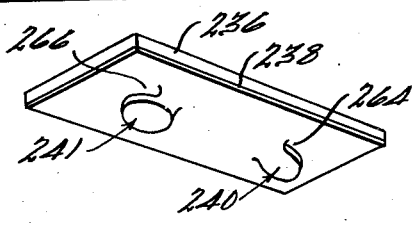
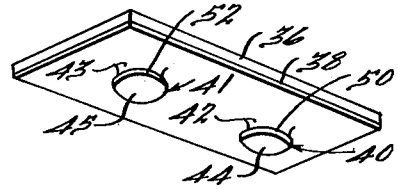
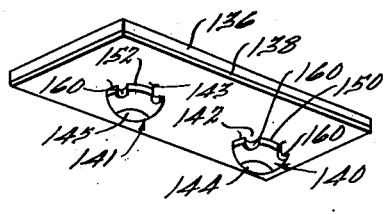
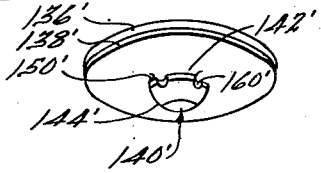
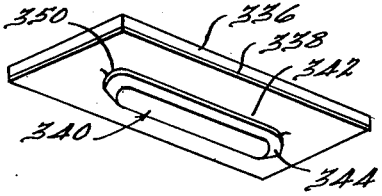
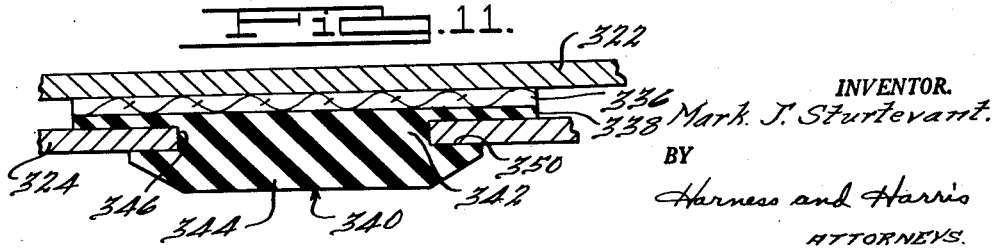
INVENTOR.
Mark J. Sturtevant.
BY
Harness and Harris
ATTORNEYS.

United States Patent Office 2,708,111
Patented May 10, 1955

2,708,111

SPRING LEAF INTERLINER

Mark J. Sturtevant, St. Clair Shores, Mich., assignor to Chrysler Corporation, Highland Park, Mich., a corporation of Delaware Application October 9, 1953, Serial No. 385,201

8 Claims. (Cl. 267—49)

My invention relates generally to leaf spring construction and particularly to a novel spring leaf interliner.

This application is a continuation-in-part of my application, Serial No. 242,535, now abandoned.

A principal object of my invention is to provide a leaf spring with a novel type of interliner which comprises a unitary construction.

Another object of my invention is to provide a novel spring leaf interliner which is easily as well as economically manufactured.

A further object of my invention is to provide a novel unitary spring leaf interliner which is provided with oppositely disposed surfaces which respectively adhere and lubricate juxtaposed facing surfaces of spring leaves.

Still another object of my invention is to provide a spring leaf interliner of novel construction wherein several components are integrally bonded together.

Another object of my invention is to provide a novel method of making my improved spring leaf interliner.

The invention comprises a spring leaf interliner which includes a layer of fabric integrally bonded to a layer of rubber-like or plastic-like material. The rubber-like layer has rubber-like plugs or buttons bonded thereto which are adapted to secure the interliner to a spring leaf. The layer of fabric is provided with a lubricated surface.

It is a further object of the invention to provide a spring leaf interliner which has a flush or flat upper surface that requires no groove or other deformation in the upper spring leaf to accommodate it. This feature permits the interliner to have a lower unit pressure than other devices in which a groove or similar deformation in the upper spring leaf decreases the effective area of engagement of the upper spring leaf and interliner.

Other objects and advantages will become more apparent from the following description of one embodiment of my invention, reference being had to the accompanying drawings in which:

Fig. 6 is a perspective view of the interliner shown in Figs. 4 and 5.

Fig. 7 is a perspective view of the interliner shown in Figs. 2 and 3.

Fig. 8 is a perspective view of a modification of the interliner shown in Figs. 2 and 3.

Fig. 9 is a perspective view of a modification of my invention.

Fig. 10 is a perspective view of another modification of my invention.

Fig. 11 is a partial longitudinal vertical sectional view of a pair of spring leaves having the interliner of Fig. 10 assembled therewith.

Figure 1:
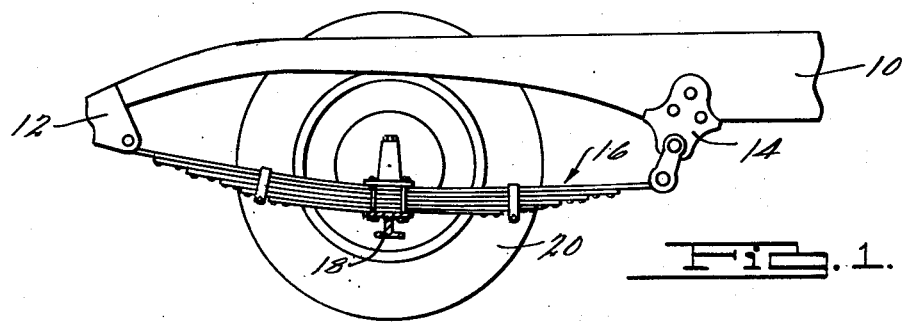
Fig. 1 is a side elevational view of a portion of a vehicle illustrating the general application of my invention.

In Fig. 1, I have shown a portion of a motor vehicle frame structure 10 which is provided with spaced mounting brackets 12 and 14. The brackets 12 and 14 pivotally support a motor vehicle leaf spring generally designated by the numeral 16. The leaf spring 16 is secured to an axle 18 which in turn is supported relative to the ground by a road wheel 20.

Figure 2:
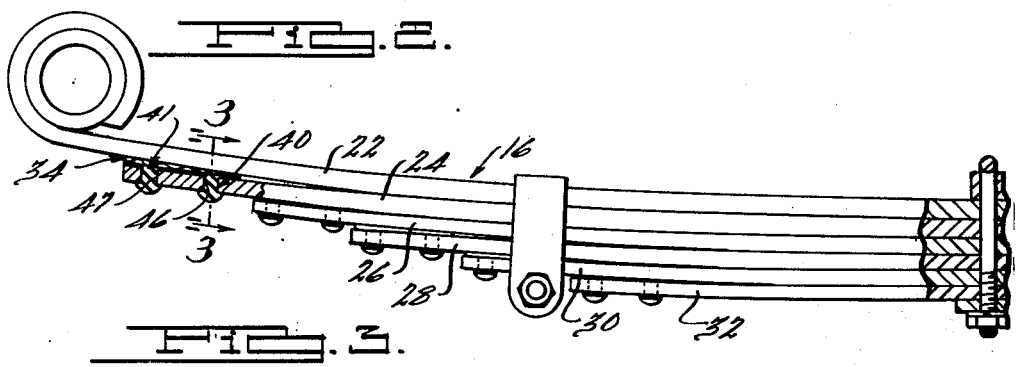
Fig. 2 is an enlarged side elevation of the leaf spring shown in Fig. 1 having portions broken away to more clearly show the invention.

As seen more clearly in Fig. 2, the leaf spring 16 comprises an upper spring leaf 22 and a plurality of progressively smaller spring leaves 24, 26, 28, 30 and 32 disposed therebeneath. Each of the spring leaves 24, 26, 28, 30 and 32 adjacent their ends are provided with spring leaf interliners generally designated by the numeral 34. The interliners 34 are identical in size and construction and the description of one will suffice for all.

For example, the spring leaf interliner disposed between the spring leaf 24 and the base leaf 22 comprises a non-metallic separator of sheet material including base layer 36 and a layer 38 of rubber-like material. The upper surface of the base layer 36 engages the under surface of the leaf 22. The opposite surface of the base layer 36 is integrally bonded to the layer 38 of rubber-like material which engages the upper surface of the leaf 24. The layer 38 is provided with a pair of molded, rubber-like and plastic-like buttons or plugs 40 and 41 which are longitudinally spaced and integrally bonded to the layer 38. The buttons 40 and 41 are provided with neck portions 42 and 43 and head portions 44 and 45, respectively, the neck portions 42 and 43 extending through openings 46 and 47 which are disposed adjacent the end portion of the spring leaf 24. The head portions 44 and 45 are of a generally partially spherical construction and are provided with circular shoulders 50 and 52 which engage the underside of the spring leaf 24 adjacent the openings 46 and 47, respectively, and serve to secure the interliner to the leaf 24. The layers 36 and 38 are substantially rectangular in form and have a width corresponding substantially to the width of the spring leaves. The head portions 44 and 45 have their yieldability and size predetermined relative to the size of the openings 46 and 47 to accommodate insertion thereof by lateral contraction of the head portions 44 and 45.

Figure 3:
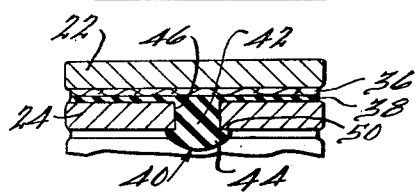
Fig. 3 is a sectional view taken on the lines 3—3 of Fig. 2.

In Fig. 8 I have shown a modification of the interliner shown in Figs. 1 to 3 which includes a base layer 136 having a rubber-like layer 138 bonded thereto, the latter having rubber-like buttons 140 and 141 bonded thereto. The buttons 140 and 141 are provided with neck portions 142 and 143 and head portions 144 and 145 respectively. The head portions 144 and 145 are substantially of frusto-conical configuration and are provided with substantially circular shoulders 150 and 152 which serve the same functions as the shoulders 50 and 52 of the interliner 34, respectively. The head portions 144 and 145 are provided with a plurality of cut out portions or notches 160 which are symmetrically disposed around the head portions and which accommodate squeezing of the head portions when it is pushed through the opening in the ends of the spring leaves.

Figure 4:
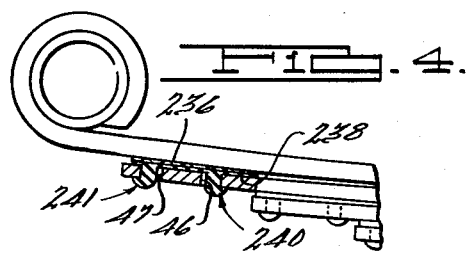
Fig. 4 is a fragmentary elevational view similar to Fig. 2 having portions broken away to more clearly show a modification of my invention.
Figure 5:
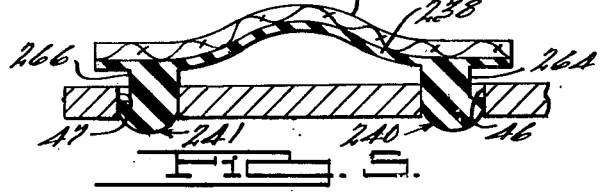
Fig. 5 is an enlarged sectional view of the spring leaf interliner shown in Fig. 4 illustrating the relationship of the parts during installation of the interliner.

In Figs. 4, 5 and 6, I have shown another modification of the interliner 34 which comprises a base layer 236 which is similarly engageable with the underside of the leaf 22 and which is integrally bonded to a rubber-like layer 238. The rubber-like layer 238 is integrally bonded to rubber-like buttons 240 and 241 which extend through the openings 46 and 47 in the leaf 24 and are adapted to secure the interliner thereto. The buttons 240 and 241 are substantially cylindrical in configuration with the exception that they are provided with outwardly oppositely extending notches 264 and 266. The notches 264 and 266 receive, as more clearly shown in Fig. 4, the furthest spaced edge portions of the openings 46 and 47 in the leaf 24. The lower surfaces of the notches 264 and 266 engage the underside of the leaf 24 adjacent the openings 46 and 47 to effect the securement of the interliner to the leaf, respectively. The distance between the longitudinal axes of the buttons 240 and 241 is greater than the distance between the centers of the openings 46 and 47 and the overall width or diameters of the buttons 240 and 241 do not exceed the diameters of the openings 46 and 47, respectively. This construction facilitates the application to the spring leaf as more celarly shown in Fig. 5. By this construction the buttons 240 and 241 may be conveniently lowered through the openings 46 and 47 while the layers 236 and 238 are initially deformed by bowing them to accommodate this passage. Thereafter, the opposite edge portions of the openings 46 and 47 are received within the notches 264 and 266 and the layers 236 and 238 become planular, as more clearly shown in Fig. 4, respectively. It will be noted that the buttons 240 and 241 may be made of less flexible rubber-like material than the buttons 40 and 41, since these buttons do not have to be compressed when they are inserted through the openings in the spring leaves.

In Fig. 9 I have shown a modification of the interliner shown in Fig. 8 which differs therefrom in that only one rubber-like button is used and the base layer and rubber-like layer of the interliner are illustrated as having a circular contour rather than a rectangular contour as illustrated in Fig. 8. Due to the similarity of the figures the prime of the reference numerals of Fig. 8 are used in Fig. 9 and reference may be had to the description of Fig. 8 for a further description.

In Figs. 10 and 11, I have shown a modification of the interliner shown in Figs. 1 to 3 which includes a base layer 336 having a rubber-like layer 338 bonded thereto, the latter having a single elongated rubber-like button 340 bonded thereto. The elongated button 340 is provided with a neck portion 342 and a head portion 344. The neck portion 342 extends through an elongated opening 346 which is disposed adjacent the end portion of a spring leaf 324, which corresponds to the spring leaf 24 of Fig. 3. The head portion 344 is of elongated construction and provided with a shoulder 350 which engages the underside of the spring leaf 324 adjacent the opening 346 and serves to secure the interliner to the leaf 324. The layers 336 and 338 are substantially rectangular in form and have a width corresponding substantially to the width of the spring leaf 324. The upper surface of the base layer 336 engages the under surface of a spring leaf 322 which corresponds to the leaf 22 of Figs. 1 through 3. The neck portion 342 of the single elongated button 340 is shaped to fit snugly in the elongated opening 346 to prevent rotation of the interliner relative to the spring leaf 324.

The base layers 36, 136, 236, 36' and 336 as shown in the five forms of my improved invention, may be formed of any satisfactory material but are preferably formed of material which is partially porous so that it will hold a solid lubricant. Various fabrics have been found very satisfactory, for example, cotton, jute, hemp, nylon and rayon. Felted or napped material has also been found satisfactory. Such fabric or material is impregnated with a solid lubricant such as wax or soap. An example of one such lubricant could be 90% steric acid, 5% calcium sterate and 5% lime. The base layers of the interliner shown must be provided with a non-frictional surface so that movement between the adjacent ends of the spring leaves is not obstructed.

The plastic-like layers 38, 138, 238, 38' and 338 as shown in the five forms of my invention may be made of any suitable type of plastic material such as polyethylene, natural or synthetic rubber. One example of synthetic rubber which has been found very satisfactory is neoprene. The plastic-like buttons which are disclosed herein may be made of the same material as the plastic-like layers. It should also be understood that my improved spring leaf interliners could be constructed entirely of plastic material which has inherent lubricating properties. Such plastic materials like nylon, polyethylene and "Teflon" (polytetrafluorethylene) may be used to form the entire interliner so that the base layer, the rubber-like layer and the retaining buttons become a unitary structure.

In accordance with my invention, I have provided an improved method of making the preferred form of my invention namely the fabric base layer having a rubber-like or plastic-like layer bonded thereto with the rubber-like or plastic-like buttons bonded to the last mentioned layer. This process includes cutting the fabric into layers of desired size and thereafter spreading a rubber compound in dough form over one side thereof. This combination of the fabric layer with the rubber-like dough spread thereon may then be heated to dry out the vehicle within the rubber-like dough. If desired this combination of the fabric layer and the rubber-like dough may be allowed to merely stand so that the vehicle in the dough will evaporate. This step in the process, of course, is slower than applying heat to drive out the vehicle. Thereafter the dough covered layer of fabric is placed in a mold and the rubber-like buttons are molded and simultaneously bonded to the plastic or rubber-like layer disposed on the fabric layer. This last mentioned step in the process also cures the rubber-like components. A transformation such as, for example, vulcanization occurs. Thereafter the fabric layer is impregnated with lubricant of the type heretofore set forth and the inerliner is completed.

My invention provides a leaf spring with an interliner which is one integral unit. The interliner may be conveniently applied to the ends of each spring leaf where it will serve to space the leaves as well as lubricate their relative movement.

While I have illustrated and described several embodiments of my invention, it is to be understood that such is for the purpose of illustration only, and it is contemplated that those skilled in the art may modify certain details without departing from the spirit or scope of the invention as defined in the claims appended hereto.

I claim:

1. A spring leaf interliner adapted to be disposed between first and second adjacent leaves of a leaf spring, said second leaf having an opening therein, comprising a layer of lubricant impregnated material engageable with said first leaf, a layer of plastic-like material disposed on said layer of lubricant impregnated material and integrally bonded thereto, said plastic-like material being engageable with one side of said second leaf, and a plastic-like button integrally connected to said plastic-like layer and having a neck portion insertable in said opening and a head portion, said head portion being notched to accommodate compression thereof for facilitating the insertion of said head portion through said opening.

2. A spring leaf interliner adapted to be disposed between a spring leaf having an opening and another spring leaf, said interliner comprising a non metallic separator of sheet material adapted to be disposed between said leaves in abutting relationship with each of said leaves, said separator having a molded and yieldable fastening means of rubber-like material bonded thereto and adapted to register with said opening, said rubber like fastening means having a neck portion adapted to extend through said opening and a terminal portion defining an abutment adapted to abut the surface of said first mentioned spring leaf which is remote from said separator for securing said separator and said first mentioned spring leaf together.

3. A spring leaf interliner adapted to be disposed between a spring leaf having longitudinally spaced openings and another spring leaf, said interliner comprising a non metallic separator of sheet material adapted to be disposed between said leaves in abutting relationship with each of said leaves, said separator having a plurality of molded and yieldable plugs of rubber-like material bonded thereto at longitudinally spaced points and adapted to register with said openings, each of said rubber like plugs having a neck portion adapted to extend through one of said openings and a terminal portion defining an abutment adapted to engage said first mentioned spring leaf for securing said separator and said first mentioned leaf together, said terminal portion having its yieldability and size predetermined relative to the size of the opening in said first mentioned leaf to accommodate insertion thereof through said opening by lateral contraction of said terminal portion.

4. A spring leaf interliner adapted to be disposed between a spring leaf having a pair of openings spaced a predetermined distance apart longitudinally of said spring leaf and another spring leaf, said interliner comprising a non-metallic separator of sheet material adapted to be disposed between said leaves in abutting relationship with each of said leaves, said separator having a plurality of rubber like plugs bonded thereto at longitudinally spaced points which are spaced apart a distance slightly in excess of said predetermined distance and which require initial deformation of said separator to accommodate registration of said plugs with said openings, the diameter of each of said openings being equal to or greater than the greatest cross sectional dimension of one of said plugs and the opposed surfaces of said plugs being notched to clampingly secure said separator to said first mentioned spring leaf as an incident to penetration of said openings by said plugs and elimination of the initial deformation of said separator.

5. A spring leaf interliner adapted to be disposed between a spring leaf having a circular opening and another spring leaf, said interliner comprising a nonmetallic separator of sheet material adapted to be disposed between said leaves in abutting relationship with each of said leaves, said separator having a single molded and yieldable plug of rubber-like material bonded thereto and adapted to register with said opening, said rubber-like plug having a neck portion adapted to extend through said opening and a terminal portion defining an abutment adapted to abut the surface of said first mentioned spring leaf which is remote from said separator for securing said separator and said first mentioned spring leaf together.

6. A spring leaf interliner adapted to be disposed between a spring leaf having a circular opening and another spring leaf, said interliner comprising a nonmetallic separator of sheet material adapted to be disposed between said leaves in abutting relationship with each of said leaves, said separator having a single molded and yieldable plug of rubber-like material bonded thereto and adapted to register with said opening, said rubber-like plug having a neck portion adapted to extend through said opening and a terminal portion defining an abutment adapted to abut the surface of said first mentioned spring leaf which is remote from said separator for securing said separator and said first mentioned spring leaf together, said terminal portion being notched to accommodate compression thereof for facilitating the insertion of said terminal portion through said opening.

7. A spring leaf interliner adapted to be disposed between a spring leaf having an elongated opening and another spring leaf, said interliner comprising a nonmetallic separator of sheet material adapted to be disposed between said leaves in abutting relationship with each of said leaves, said separator having an elongated rubber like plug bonded thereto and adapted to register with said opening, said rubber like plug having an elongated neck portion adapted to extend through said elongated opening and an elongated terminal portion defining an abutment adapted to engage said first mentioned spring leaf in the vicinity of said opening for securing said separator and said first mentioned leaf together, said neck portion being shaped to fit snugly in said elongated opening to resist relative rotation between said interliner and said first mentioned spring leaf, and said elongated terminal portion having its yieldability and size predetermined relative to the size of the elongated opening in said first mentioned leaf to accommodate insertion thereof through said opening by lateral contractiton of said terminal portion.

8. A spring leaf interliner adapted to be disposed between a spring leaf having an elongated opening extending longitudinally of said spring leaf and another spring leaf, said interliner comprising a nonmetallic separator of sheet material adapted to be disposed between said leaves in abutting relationship with each of said leaves, said separator having a single elongated rubber like plug bonded thereto and adapted to register with said opening, said rubber like plug having an elongated neck portion having a cross section corresponding to the cross section of said elongated opening and adapted to extend through said elongated opening, said rubber like plug also being provided with an elongated terminal portion defining an abutment adapted to engage said first mentioned spring leaf in the vicinity of said opening for securing said separator and said first mentioned leaf together, said neck portion being shaped to fit snugly in said elongated opening to resist relative rotation between said interliner and said first mentioned spring leaf, and said elongated terminal portiton having its yieldability and size predetermined relative to the size of the elongated opening in said first mentioned leaf to accommodate insertion thereof through said opening by lateral contraction of said terminal portion.

References Cited in the file of this patent

UNITED STATES PATENTS

| Number | Name | Date |
| --- | --- | --- |
| 2,029,366 | Geyer | Feb. 4, 1936 |
| 2,172,132 | Schneible | Sept. 5, 1939 |
| 2,319,172 | Watson et al. | May 11, 1943 |
| 2,346,092 | Tollzien | Apr. 4, 1944 |
| 2,355,801 | Hildenbrand | Aug. 15, 1944 |
| 2,476,367 | Guernsey | July 19, 1949 |